(12) United States Patent
Wang et al.

(10) Patent No.: US 8,482,916 B2
(45) Date of Patent: Jul. 9, 2013

(54) MOBILE COMPUTING APPARATUS

(75) Inventors: Feng-Ku Wang, Taipei (TW); Yi-Lun Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 268 days.

(21) Appl. No.: 13/176,390

(22) Filed: Jul. 5, 2011

(65) Prior Publication Data

US 2012/0194995 A1 Aug. 2, 2012

(30) Foreign Application Priority Data

Jan. 31, 2011 (TW) .............................. 100103734 A

(51) Int. Cl.
H05K 7/20 (2006.01)
(52) U.S. Cl.
USPC .............. 361/679.47; 361/679.48; 361/679.5; 361/679.52; 361/695; 361/699
(58) Field of Classification Search
None
See application file for complete search history.

(56) References Cited

U.S. PATENT DOCUMENTS

| | | | |
|---|---|---|---|
| 6,031,721 A * | 2/2000 | Bhatia ........................... | 361/695 |
| 6,958,910 B2 * | 10/2005 | Tanaka et al. ................. | 361/699 |
| 7,652,883 B2 * | 1/2010 | Chikazawa et al. ........... | 361/695 |
| 7,667,961 B2 * | 2/2010 | Fujiwara .................. | 361/679.47 |
| 7,742,295 B2 * | 6/2010 | Hata et al. ................ | 361/679.47 |
| 7,961,467 B2 * | 6/2011 | Hongo .......................... | 361/700 |
| 8,045,327 B2 * | 10/2011 | Tomioka et al. ......... | 361/679.47 |
| 8,125,783 B2 * | 2/2012 | Tanaka .......................... | 361/720 |
| 8,144,460 B2 * | 3/2012 | Luo et al. ................ | 361/679.47 |
| 8,184,434 B2 * | 5/2012 | Elwany ......................... | 361/695 |
| 2006/0023421 A1 * | 2/2006 | Hata et al. .................... | 361/695 |

FOREIGN PATENT DOCUMENTS

| | | |
|---|---|---|
| TW | 470176 | 12/2001 |
| TW | I321442 | 3/2010 |
| TW | 422368 | 2/2011 |

* cited by examiner

*Primary Examiner* — Boris Chervinsky
(74) *Attorney, Agent, or Firm* — Morris Manning & Martin LLP; Tim Tingkang Xia, Esq.

(57) ABSTRACT

A mobile computing apparatus includes a shell, a circuit board, a first heat-dissipation module, a centrifugal fan for exhaust, and a centrifugal fan for convection. The shell has a first through hole. The circuit board is disposed on the shell, and has a first heat-generation device. The first heat-dissipation module has a first heat-absorption end and a first heat-dissipation end, and the first heat-absorption end thermally contacts with the first heat-generation device. The centrifugal fan for exhaust has a first gas outlet, and the first heat-dissipation end is located between the first gas outlet and the first through hole, so that the centrifugal fan for exhaust exhausts to an outside of the shell. The centrifugal fan for convection is configured in the shell, and exhausts to an inside of the shell. Therefore, gas flow circulation occurs in the shell, so that the mobile computing apparatus has a desirable heat-dissipation effect.

18 Claims, 8 Drawing Sheets

MOBILE COMPUTING APPARATUS

CROSS-REFERENCE TO RELATED APPLICATIONS

This non-provisional application claims priority under 35 U.S.C. §119(a) on Patent Application No(s). 100103734 filed in Taiwan, R.O.C. on Jan. 31, 2011, the entire contents of which are hereby incorporated by reference.

BACKGROUND OF THE INVENTION

1. Field of the Invention

The present invention relates to a mobile computing apparatus, and in particular, to a mobile computing apparatus having a plurality of heat-dissipation fans.

2. Related Art

With the constant development of technology, current daily necessities develop toward digitization and informatization. For example, a mobile computing apparatus, such as a notebook computer and a tablet computer, is easily carried by a user, so as to be freely used by the user in any occasions.

However, under the trend of technology development, the researchers devote their efforts to continuously developing the mobile computing apparatus toward the objectives of having high performances, and a light, thin, short, and small volume. Therefore, a heat-dissipation structure of the mobile computing apparatus is particularly important. Referring to FIGS. 1A and 1B, FIG. 1A is a schematic structural view of a conventional mobile computing apparatus, and FIG. 1B is a structural perspective view of the conventional mobile computing apparatus.

The conventional mobile computing apparatus has a shell 100', a circuit board 200', a first heat-dissipation module 300', a second heat-dissipation module 400', a first centrifugal fan 500', and a second centrifugal fan 600', in which the shell 100' comprises a top plate 110' and a bottom plate 120' being opposite to each other, and a side plate 130' connecting the bottom plate 120' and the top plate 110'. The side plate 130' has a first through hole 131' and a second through hole 132', and the bottom plate 120' has a plurality of gas vents 121'.

The circuit board 200' is disposed in the shell 100', and has a central processing unit (CPU) 11', a graphics processing unit (GPU) 12', and a memory 13'. In addition, the first centrifugal fan 500' and the second centrifugal fan 600' are disposed on the circuit board 200', in which the first centrifugal fan 500' is adjacent to the first through hole 131', and the second centrifugal fan 600' is adjacent to the second through hole 132'. One end of the first heat-dissipation module 300' thermally contacts with the CPU 11', and the other end of the first heat-dissipation module 300' is located between the first centrifugal fan 500' and the first through hole 131'. The first heat-dissipation module 300' absorbs a heat energy generated by the CPU 11', and discharges the heat energy absorbed by the first heat-dissipation module 300' to the outside of the shell 100' through the first through hole 131' by using the gas flow generated by the first centrifugal fan 500'.

One end of the second heat-dissipation module 400' thermally contacts with the CPU 11' and the GPU 12' at the same time, and the other end of the second heat-dissipation module 400' is located between the second centrifugal fan 600' and the second through hole 132'. The second heat-dissipation module 400' absorbs an heat energy generated by the CPU 11' and the GPU 12', and discharges the heat energy absorbed by the second heat-dissipation module 400' to the outside of the shell 100' through the second through hole 132' by using the gas flow generated by the second centrifugal fan 600'.

The path of the gas flow generated by the first centrifugal fan 500' and the second centrifugal fan 600' is as follows: the external air is absorbed into the shell 100' by the plurality of gas vents 121', then moves toward the first centrifugal fan 500' and the second centrifugal fan 600', and the air discharged by the first centrifugal fan 500' and the second centrifugal fan 600' flows to the outside of the shell 100' through the first through hole 131' and the second through hole 132'.

However, such heat-dissipation structure of the conventional mobile computing apparatus performs the heat-dissipation merely for the CPU 11' and the GPU 12'. The path of the gas flow is lacked or even no path of the gas flow passes through the location of the memory 13', so the heat-dissipation effect of the memory 13' located between the first centrifugal fan 500' and the second centrifugal fan 600' is undesirable, and therefore the heat energy of the memory 13' is difficult to dissipate. In this way, the temperature of the memory 13' and the air around the memory 13' continuously rises, so that a system of the mobile computing apparatus easily breaks down, and even the memory 13' is damaged.

In addition, the first centrifugal fan 500' and the second centrifugal fan 600' respectively and independently form the paths of the gas flow with the gas vents 121', and therefore the heat of heat-generation components being not located on the paths of the gas flow is easily accumulated on the adjacent bottom plate, so that the temperature of a part of the bottom plate is excessively high.

SUMMARY OF THE INVENTION

Accordingly, the present invention is a mobile computing apparatus, which solves the problem that, the heat-dissipation effect of the double-fan configuration type of the conventional mobile computing apparatus is undesirable, and thus the system of the mobile computing apparatus easily breaks down due to the excessively high temperature.

The present invention provides a mobile computing apparatus, which comprises a shell, a circuit board, a first heat-dissipation module, a centrifugal fan for exhaust, and a centrifugal fan for convection. The shell comprises a top plate and a bottom plate being opposite to each other, and a side plate connecting the bottom plate and the top plate, in which the side plate has a first through hole. The circuit board is located among the top plate, the bottom plate, and the side plate, and has a first heat-generation device. The first heat-dissipation module has a first heat-absorption end and a first heat-dissipation end, and the first heat-absorption end thermally contacts with the first heat-generation device. The centrifugal fan for exhaust has a first gas outlet, and the first heat-dissipation end is located between the first gas outlet and the first through hole, so that the centrifugal fan for exhaust exhausts to the outside of the shell. In addition, the centrifugal fan for convection is configured in the shell, and exhausts toward a first direction, so that the centrifugal fan for convection exhausts to the inside of the shell.

The present invention also provides a mobile computing apparatus, which comprises a shell, a circuit board, a first heat-dissipation module, a centrifugal fan with cover, and a centrifugal fan without cover. The shell comprises a top plate and a bottom plate being opposite to each other, and a side plate connecting the bottom plate and the top plate, in which the side plate has a first through hole. The circuit board is located among the top plate, the bottom plate, and the side plate, and has a first heat-generation device. The first heat-dissipation module has a first heat-absorption end and a first heat-dissipation end, and the first heat-absorption end thermally contacts with the first heat-generation device. The centrifugal fan with cover has a first gas outlet, and the first heat-dissipation end is located between the first gas outlet and the first through hole, so that the centrifugal fan with cover exhausts to the outside of the shell. The centrifugal fan without cover is configured in the shell, and comprises a second base, a second centrifugal fan blade, and a second motor. The second centrifugal fan blade is located on the second base, and the second motor is connected to the second centrifugal fan blade and is located between the second centrifugal fan blade and the second base, in which a part of the gas flow generated by the second centrifugal fan blade flows toward a first direction, so that the centrifugal fan without cover exhausts to the inside of the shell.

The present invention further provides a mobile computing apparatus, which comprises a shell, a circuit board, a first heat-dissipation module, a centrifugal fan with cover, and a centrifugal fan without cover. The shell comprises a top plate and a bottom plate being opposite to each other, and a side plate connecting the bottom plate and the top plate, in which the side plate has a first through hole. The circuit board is located among the top plate, the bottom plate, and the side plate, and has a first heat-generation device. The first heat-dissipation module has a first heat-absorption end and a first heat-dissipation end, and the first heat-absorption end thermally contacts with the first heat-generation device. The centrifugal fan with cover has a first gas outlet, and the first heat-dissipation end is located between the first gas outlet and the first through hole, so that the centrifugal fan with cover exhausts to the outside of the shell. The centrifugal fan without cover is configured in the shell, and basically comprises a second base, a second centrifugal fan blade, and a second motor. The second centrifugal fan blade is located on the second base, and the second motor is connected to the second centrifugal fan blade and is located between the second centrifugal fan blade and the second base, in which a part of the gas flow generated by the second centrifugal fan blade flows toward a first direction, so that the centrifugal fan without cover exhausts to the inside of the shell.

According to the mobile computing apparatus provided by the present invention, the centrifugal fan for convection exhausts to the inside of the shell, so that forced convection is generated in the mobile computing apparatus, and thus the hot air in the mobile computing apparatus does not stop at a specific area. In this way, since the hot air located in the specific area is constantly replaced by the cold air from other areas, the electronic components in the specific area can operate under a low working temperature in comparison with the prior art. Such mobile computing apparatus has better heat-dissipation effect than the conventional mobile computing apparatus, so that the stability of the entire system of the mobile computing apparatus further rises.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 2A:
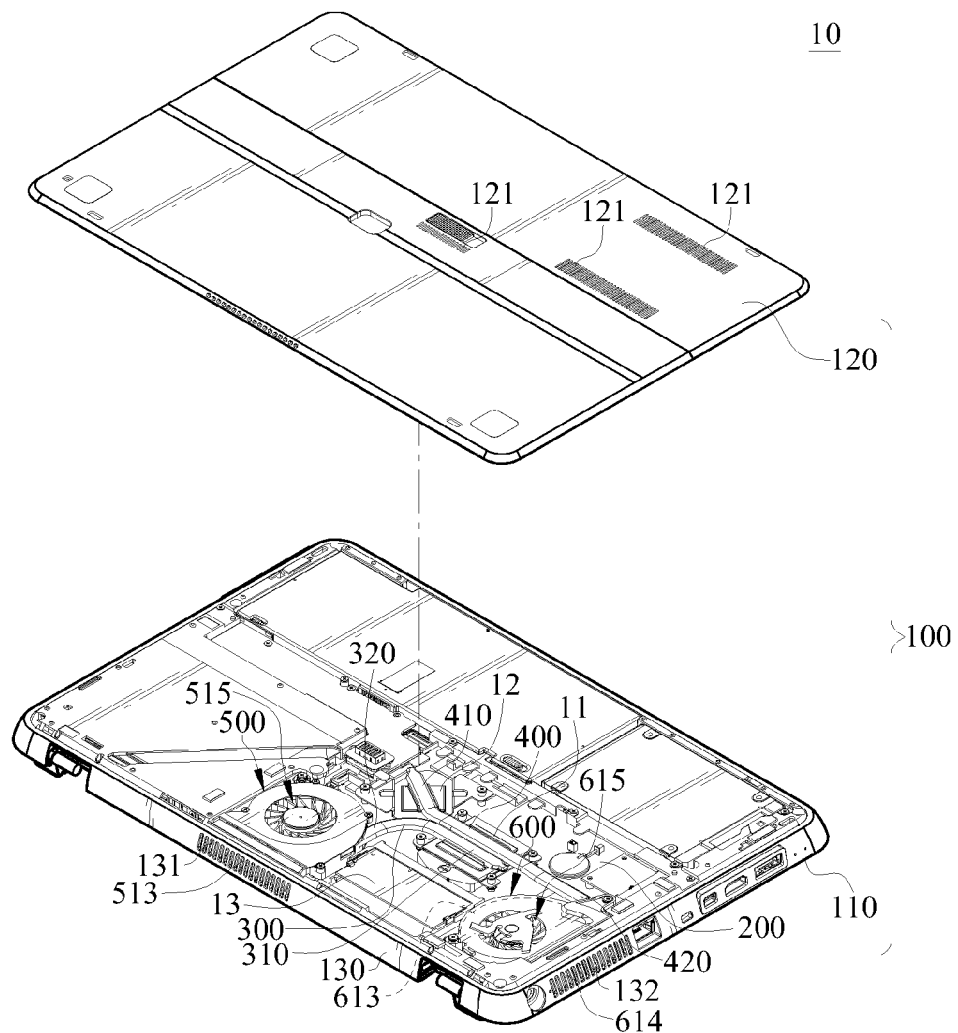
FIG. 2A is a schematic structural view of a mobile computing apparatus according to an embodiment of the present invention.
Figure 2B:
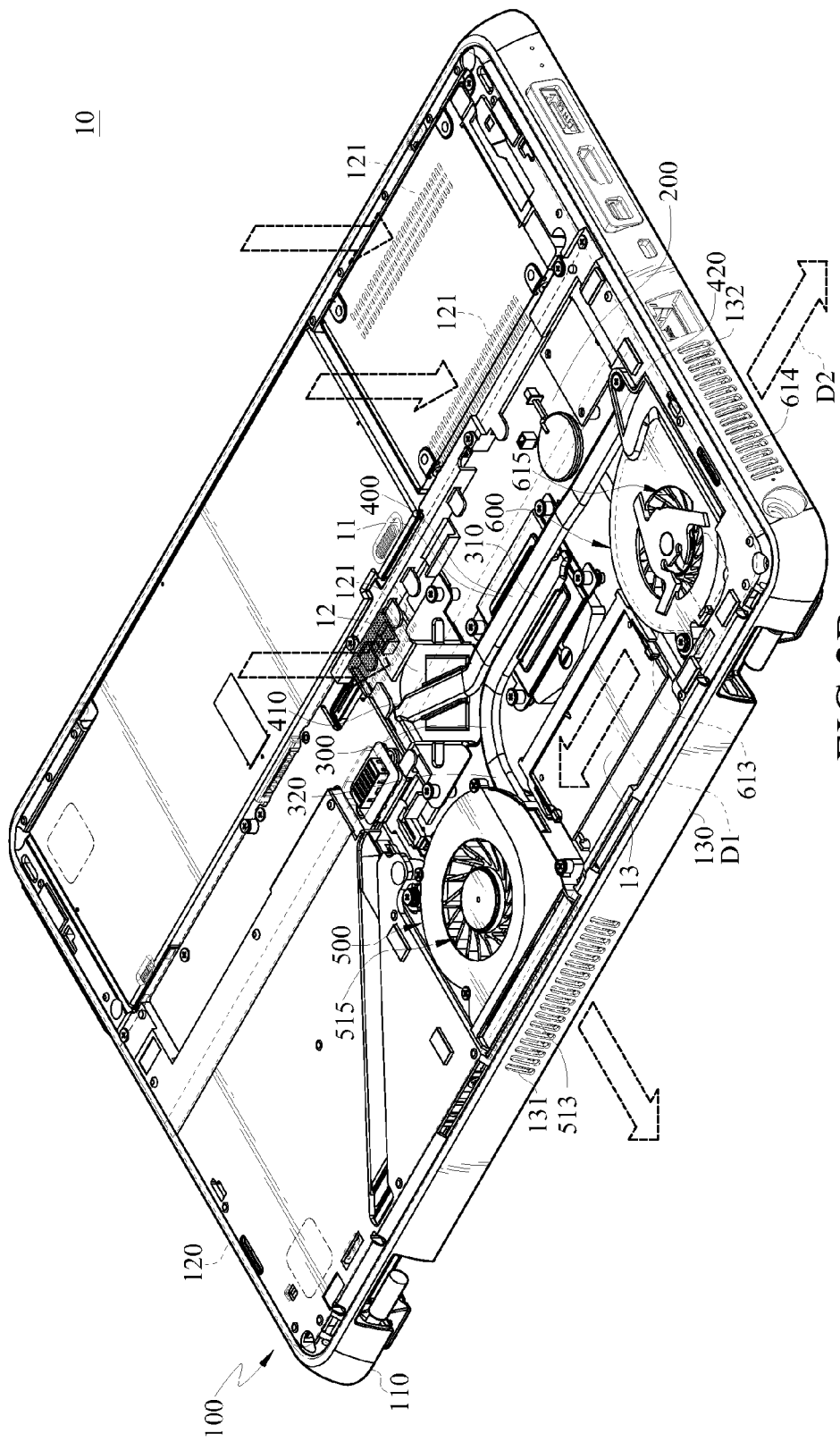
FIG. 2B is a structural perspective view of a mobile computing apparatus according to an embodiment of the present invention.
Figure 2C:
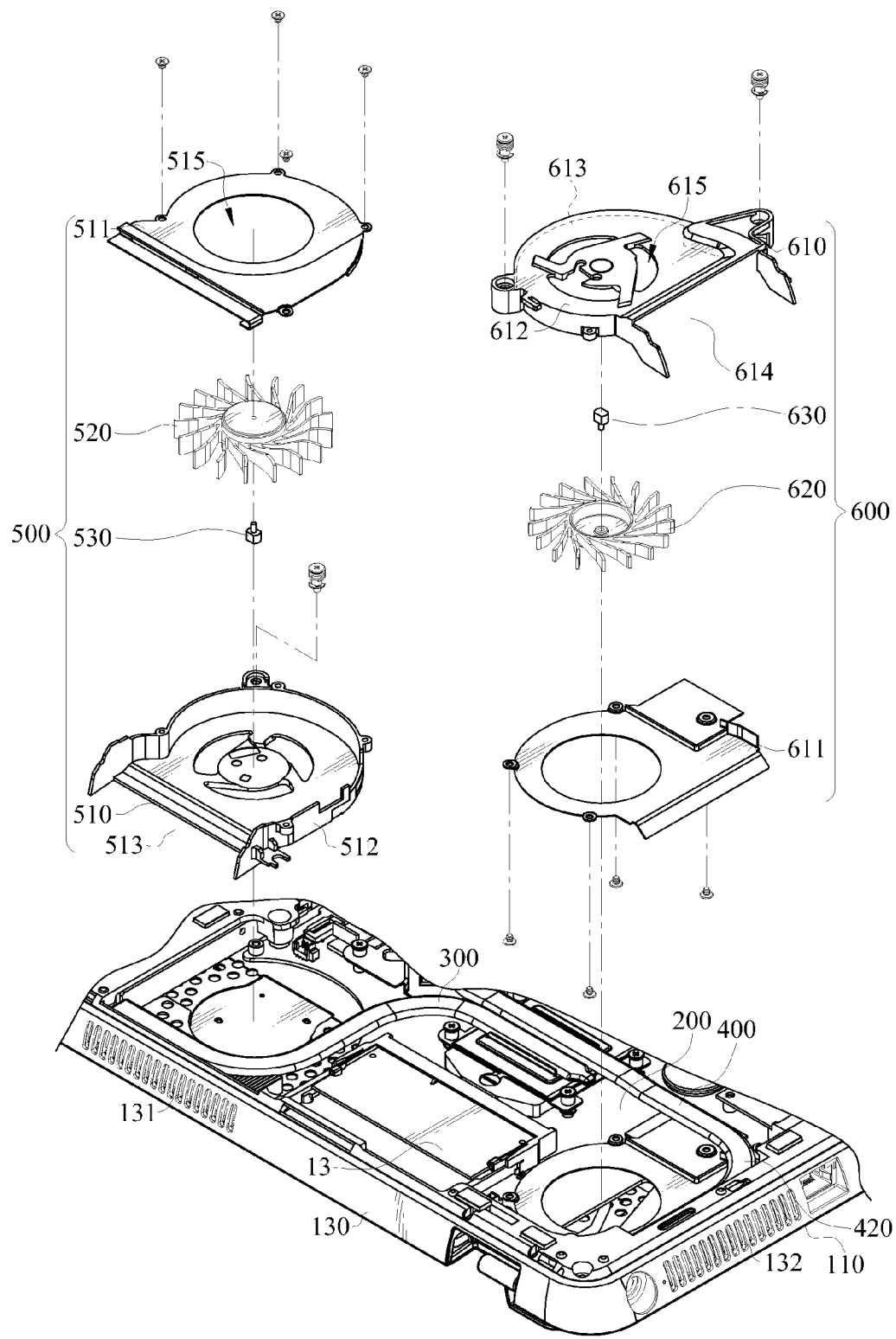
FIG. 2C is a schematic structural view of a centrifugal fan for exhaust and a centrifugal fan for convection according to an embodiment of the present invention.

Referring to FIGS. 2A to 2C, FIG. 2A is a schematic structural view of a mobile computing apparatus according to an embodiment of the present invention; FIG. 2B is a structural perspective view of a mobile computing apparatus according to an embodiment of the present invention; and FIG. 2C is a schematic structural view of a centrifugal fan for exhaust and a centrifugal fan for convection according to an embodiment of the present invention.

The mobile computing apparatus 10 in this embodiment may be a common notebook computer or a tablet computer. The mobile computing apparatus 10 comprises a shell 100, a circuit board 200, a first heat-dissipation module 300, a centrifugal fan for exhaust 500, and a centrifugal fan for convection 600.

The shell 100 in this embodiment comprises a top plate 110 and a bottom plate 120 being opposite to each other, and a side plate 130 connecting the bottom plate 120 and the top plate 110, in which the side plate 130 has a first through hole 131. In addition, the bottom plate 120 has a plurality of gas vents 121.

The circuit board 200 is disposed in the shell 100, that is, the circuit board 200 is located among the top plate 110, the bottom plate 120, and the side plate 130, in which the circuit board 200 has a first heat-generation device 11 which may be a CPU of the mobile computing apparatus 10. It should be noted that, although the CPU is used as an example of the first heat-generation device 11 in this embodiment, this embodiment is not intended to limit the type of the first heat-generation device 11 of the present invention. In other embodiments of the present invention, the first heat-generation device 11 may also be any electronic units having heat-generation phenomenon on the circuit board 200.

Referring to FIG. 2B, the first heat-dissipation module 300 in this embodiment has a first heat-absorption end 310 and a first heat-dissipation end 320, in which the first heat-dissipation module 300 may comprise, but not limited to, a heat pipe and a heat dissipation fin. The first heat-absorption end 310 of the first heat-dissipation module 300 thermally contacts with the first heat-generation device 11. Furthermore, through the thermal contact of the first heat-absorption end 310 and the first heat-generation device 11, the heat energy generated by the first heat-generation device 11 may be delivered to the first heat-dissipation module 300.

Referring to FIGS. 2A to 2C, the centrifugal fan for exhaust 500 is disposed on the circuit board 200, and the centrifugal fan for exhaust 500 in this embodiment is a centrifugal fan with cover. The centrifugal fan for exhaust 500 comprises a first base 510, a first centrifugal fan blade 520, and a first motor 530. The first base 510 has a first surface 511 and a first cover 512 standing on the first surface 511. The first centrifugal fan blade 520 is located on the first surface 511, and the first motor 530 is connected to the first centrifugal fan blade 520 and is located between the first centrifugal fan blade 520 and the first surface 511.

In addition, the first centrifugal fan blade 520 and the first motor 530 are accommodated in an accommodation space formed together by the first cover 512 and the first base 510. The first cover 512 has a first gas outlet 513 and a first gas inlet 515, in which the first gas outlet 513 corresponds to the first through hole 131, so that the gas flow discharged through the first gas outlet 513 may be discharged to the outside of the shell 100 through the first through hole 131.

In addition, the first gas inlet 515 faces toward the bottom plate 120 and is shielded by the bottom plate 120, and a gap exists between the bottom plate 120 and the first gas inlet 515. In this way, when the centrifugal fan for exhaust 500 operates, the centrifugal fan for exhaust 500 may absorb the gas in the mobile computing apparatus 10 into the centrifugal fan for exhaust 500 through the gap.

Moreover, the first heat-dissipation end 320 of the first heat-dissipation module 300 is located between the first gas outlet 513 of the centrifugal fan for exhaust 500 and the first through hole 131. In other words, the first heat-dissipation end 320 is located on a flowing path of the gas flowing toward the first through hole 131 and generated by the centrifugal fan for exhaust 500.

When the centrifugal fan for exhaust 500 operates, the gas flow out of the shell 100 will flow into the shell 100 through the plurality of gas vents 121 of the bottom plate 120. The gas flow in the shell 100 flows in or out of the centrifugal fan for exhaust 500 through the first gas inlet 515 and the first gas outlet 513 of the centrifugal fan for exhaust 500, and the centrifugal fan for exhaust 500 discharges the gas flow through the first gas outlet 513 and blows the gas flow to the first heat-dissipation end 320, so as to dissipate the heat of the first heat-dissipation end 320.

After the heat exchange of the gas flow discharged through the first gas outlet 513 and the first heat-dissipation end 320, the gas flow is discharged to the outside of the shell 100 through the first through hole 131. Therefore, the first heat-dissipation module 300 and the centrifugal fan for exhaust 500 are disposed to discharge the heat energy generated by the first heat-generation device 11 to the outside of the shell 100.

The centrifugal fan for convection 600 in this embodiment is configured in the shell 100 and is located on the circuit board 200. Furthermore, the centrifugal fan for convection 600 comprises a second base 610, a second centrifugal fan blade 620, and a second motor 630. The second base 610 has a second surface 611 and a second cover 612 standing on the second surface 611. The second centrifugal fan blade 620 is located on the second surface 611, and the second motor 630 is connected to the second centrifugal fan blade 620 and is located between the second centrifugal fan blade 620 and the second surface 611.

In addition, the second cover 612 receives the second centrifugal fan blade 620 and the second motor 630 in an accommodation space formed together by the second cover 612 and the second base 610. The second cover 612 has a second gas outlet 613 and a second gas inlet 615, in which the second gas outlet 613 faces toward the inside of the mobile computing apparatus 10.

In this embodiment, the second gas outlet 613 faces toward a first direction D1, in which the first direction D1 is a direction from the centrifugal fan for convection 600 to the centrifugal fan for exhaust 500, that is, the second gas outlet 613 faces toward the centrifugal fan for exhaust 500, so that the centrifugal fan for convection 600 exhausts toward the first direction D1 and a part of the gas discharged by the centrifugal fan for convection 600 is absorbed into the centrifugal fan for exhaust 500 through the first gas inlet 515.

The second gas inlet 615 faces toward the bottom plate 120 and is shielded by the bottom plate 120, and a gap exists between the bottom plate 120 and the second gas inlet 615. In this way, it is ensured that the second gas inlet 615 is not closed by the bottom plate 120, so that the gas flow may smoothly flow into the centrifugal fan for convection 600 through the second gas inlet 615.

In addition, in this embodiment, the heat-generation module 13 may be further configured between the centrifugal fan for exhaust 500 and the centrifugal fan for convection 600, so that the heat-generation module 13 is located on the flowing path of the gas flow flowing from the centrifugal fan for convection 600 to the centrifugal fan for exhaust 500, in which the heat-generation module 13 is, for example, a memory card.

In this way, in this embodiment, the heat generated by the heat-generation module 13 is removed by using the gas flow flowing from the centrifugal fan for convection 600 to the centrifugal fan for exhaust 500. Therefore, in this embodiment, the hot air heated by the heat-generation module 13 is avoided to be accumulated around the heat-generation module 13, thereby preventing the temperature of the heat-generation module 13 from being increased continuously. Afterwards, the hot air after the heat exchange with the heat-generation module 13 flows into the centrifugal fan for exhaust 500 through the first gas inlet 515, and is discharged to the outside of the shell 100 through the operation of the centrifugal fan for exhaust 500.

Moreover, the mobile computing apparatus 10 of this embodiment may further comprise a second heat-dissipation module 400, the second cover 612 may further have a third gas outlet 614, and the side plate 130 may further have a second through hole 132. The second heat-dissipation module 400 has a second heat-absorption end 410 and a second heat-dissipation end 420, and may comprise, but not limited to, a heat pipe and a heat dissipation fin. The second heat-absorption end 410 of the second heat-dissipation module 400 may further thermally contact with a second heat-generation device 12 of the circuit board 200 in addition to the first heat-generation device 11, in which the second heat-generation device 12 is, for example, a GPU.

The third gas outlet 614 of the second cover 612 faces toward a second direction D2. The second direction D2 is a direction from the centrifugal fan for convection 600 to the second through hole 132, that is, the third gas outlet 614 faces toward the second through hole 132, so that the centrifugal fan for convection 600 exhausts toward the second direction D2. The second heat-dissipation end 420 of the second heat-dissipation module 400 is located between the second through hole 132 and the third gas outlet 614.

Furthermore, through the thermal contact of the second heat-absorption end 410, and the second heat-generation device 12 and the first heat-generation device 11 at the same time, the heat energy generated by the first heat-generation device 11 and the second heat-generation device 12 may be delivered to the second heat-dissipation module 400 due to heat conduction. The second heat-dissipation end 420 is located on a flowing path of the gas flowing toward the second direction D2 and generated by the centrifugal fan for convection 600.

Therefore, when the centrifugal fan for convection 600 operates, the gas flow in the shell 100 will flow into the centrifugal fan for convection 600 through the second gas inlet 615 of the centrifugal fan for convection 600. Afterwards, the centrifugal fan for convection 600 discharges the gas through the third gas outlet 614 in addition to discharging the gas through the second gas outlet 613. The gas flow discharged through the third gas outlet 614 flows toward the second direction D2, and passes through the second heat-dissipation end 420, so as to perform the heat exchange on the second heat-dissipation end 420. After the heat exchange of the gas flow discharged through the third gas outlet 614 and the second heat-dissipation end 420, the gas flow is discharged to the outside of the shell 100 through the second through hole 132.

It should be noted that, in this embodiment, the second heat-absorption end 410 thermally contacts with the second heat-generation device 12 and the first heat-generation device 11 at the same time, but the configuration manner of the second heat-absorption end 410 is not intended to limit the present invention. For example, in another embodiment of the present invention, the second heat-absorption end 410 may merely thermally contact with the second heat-generation device 12, but not thermally contact with the first heat-generation device 11.

Therefore, the second heat-dissipation module 300 and the centrifugal fan for convection 600 are disposed to discharge the heat energy generated by the first heat-generation device 11 and the second heat-generation device 12 to the outside of the shell 100, and dissipate the heat of the heat-generation module 13 at the same time. Through such mobile computing apparatus 10, the gas flow is generated in the shell 100 and thus the effect of heat convection is achieved, and therefore the heat-dissipation effect on the plurality of heat-generation units in the mobile computing apparatus 10 is ensured.

Figure 3A:
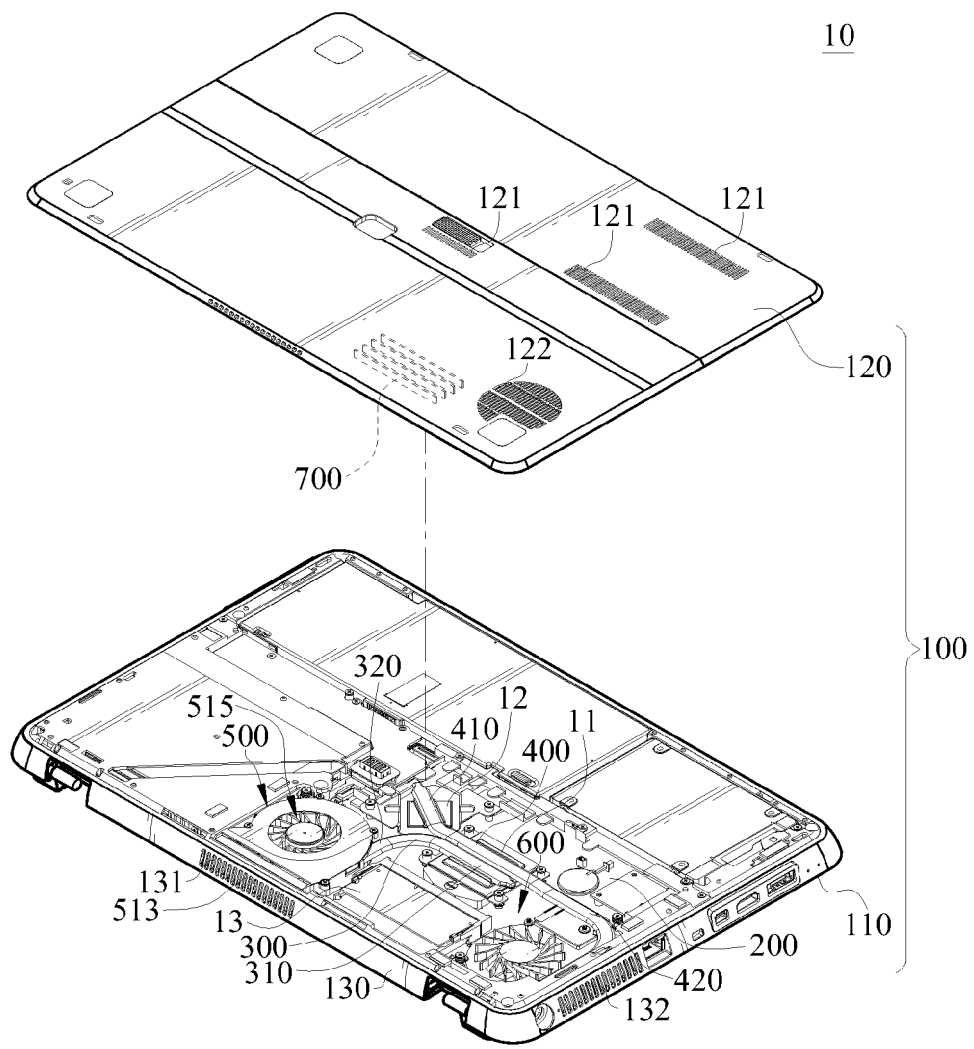
FIG. 3A is a schematic structural view of a mobile computing apparatus according to another embodiment of the present invention.
Figure 3B:
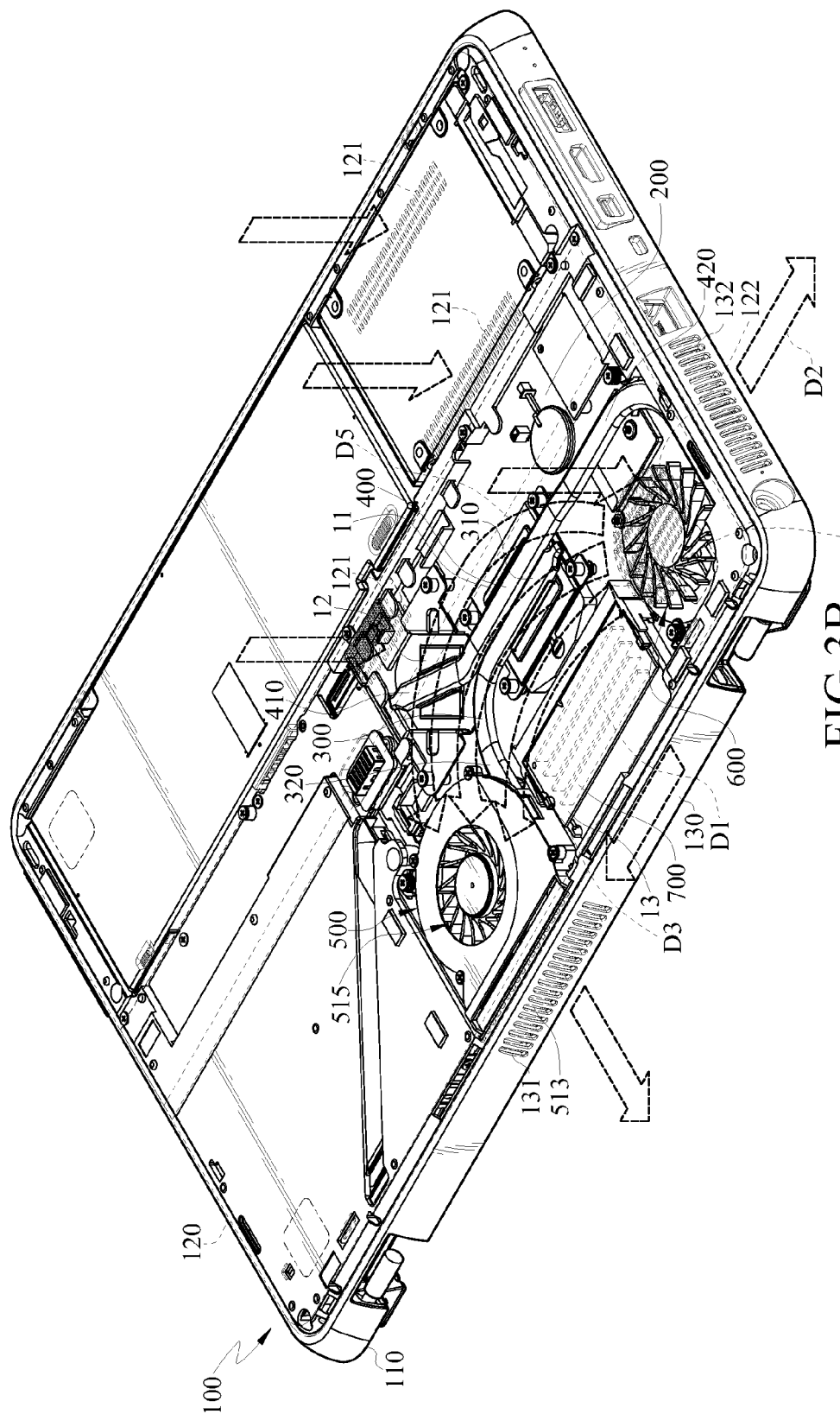
FIG. 3B is a structural perspective view of a mobile computing apparatus according to another embodiment of the present invention.
Figure 3C:
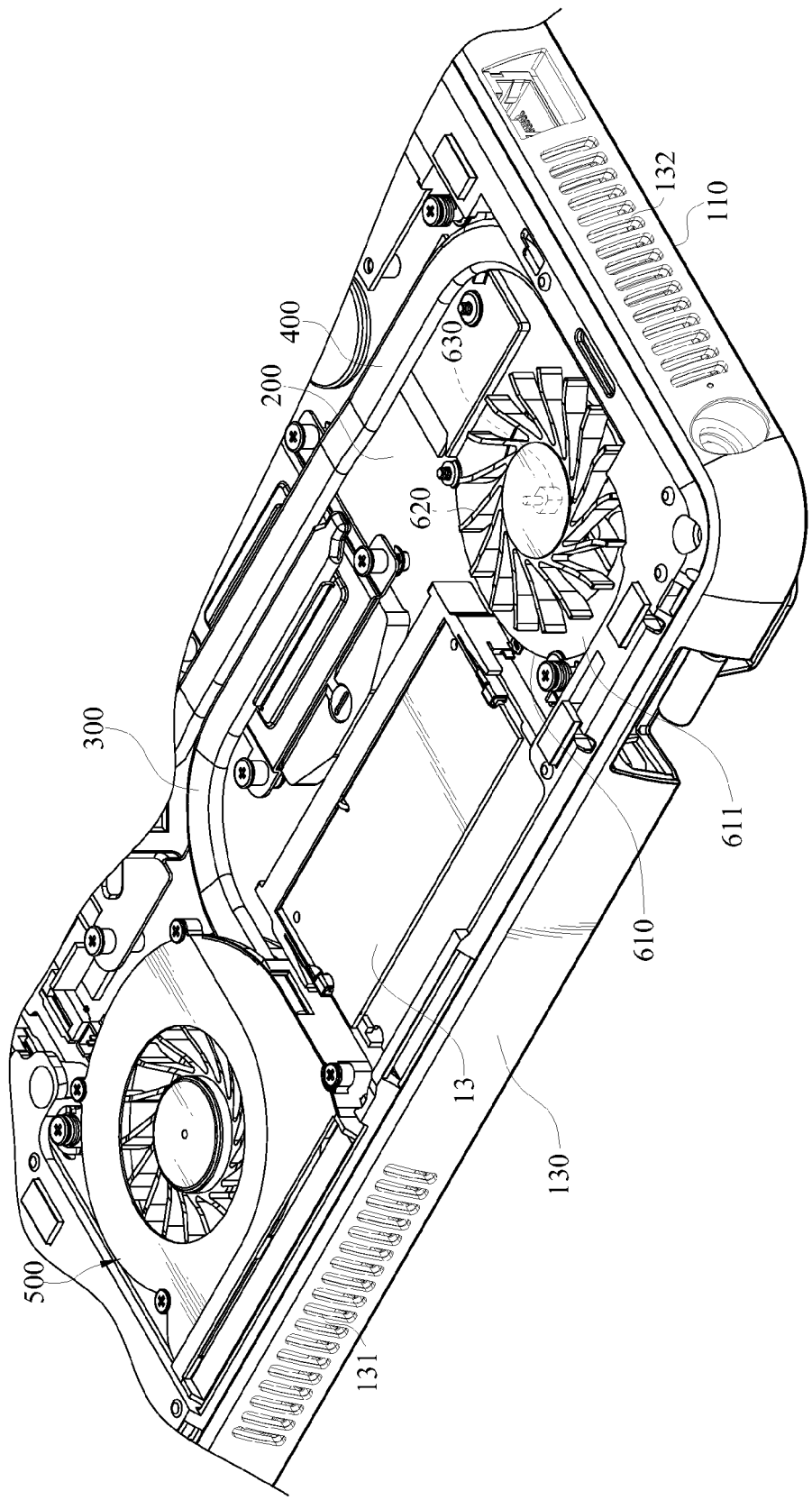
FIG. 3C is a schematic structural view of a centrifugal fan for convection according to another embodiment of the present invention.

Referring to FIGS. 3A to 3C, FIG. 3A is a schematic structural view of a mobile computing apparatus according to another embodiment of the present invention; FIG. 3B is a structural perspective view of a mobile computing apparatus according to another embodiment of the present invention; and FIG. 3C is a schematic structural view of a centrifugal fan for convection according to another embodiment of the present invention.

Since the structure of a mobile computing apparatus 10 according to another embodiment of the present invention is similar to the embodiment illustrated from FIGS. 2A to 2C, the same structure is not described in detail herein. The same numbers from FIGS. 3A to 3C and from FIGS. 2A to 2C represent the similar objects.

The mobile computing apparatus 10 comprises a shell 100, a circuit board 200, a first heat-dissipation module 300, a centrifugal fan for exhaust 500, and a centrifugal fan for convection 600. In addition, the mobile computing apparatus 10 may further comprise a second heat-dissipation module 400.

The shell 100 in this embodiment comprises a top plate 110 and a bottom plate 120 being opposite to each other, and a side plate 130 connecting the bottom plate 120 and the top plate 110, in which, the bottom plate 120 has a third through hole 122 in addition to a plurality of gas vents 121.

The circuit board 200 is disposed in the shell 100, that is, the circuit board 200 is located among the top plate 110, the bottom plate 120, and the side plate 130, in which, the circuit board 200 may have a first heat-generation device 11, a second heat-generation device 12. and a third heat-generation device 13.

In this embodiment, the first heat-dissipation module 300 has a first heat-absorption end 310 and a first heat-dissipation end 320, and the first heat-absorption end 310 of the first heat-dissipation module 300 thermally contacts with the first heat-generation device 11.

The centrifugal fan for exhaust 500 is disposed on the circuit board 200, and in this embodiment, the centrifugal fan for exhaust 500 is a centrifugal fan with cover, and the structure thereof is roughly the same as the centrifugal fan for exhaust 500 in FIG. 2C.

In addition, the first heat-dissipation end 320 of the first heat-dissipation module 300 is located between the first gas outlet 513 of the centrifugal fan for exhaust 500 and the first through hole 131. In other words, the first heat-dissipation end 320 is located on a flowing path of the gas flowing toward the first through hole 131 and generated by the centrifugal fan for exhaust 500.

In this embodiment, the centrifugal fan for convection 600 is configured in the shell 100, and is located on the circuit board 200, and moreover, the heat-generation module 13 is located between the centrifugal fan for convection 600 and the centrifugal fan for exhaust 500. Furthermore, in this embodiment, the centrifugal fan for convection 600 is a centrifugal fan without cover. The centrifugal fan for convection 600 basically comprises a second base 610, a second centrifugal fan blade 620, and a second motor 630. The second base 610 has a second surface 611. In addition, the second centrifugal fan blade 620 is located on the second surface 611, and the third through hole 122 exposes a part of the second centrifugal fan blade 620. The second motor 630 is connected to the second centrifugal fan blade 620, and is located between the second centrifugal fan blade 620 and the second surface 611. Specifically, the second base 610 does not have a cover structure standing thereon, and therefore the second centrifugal fan blade 620 is not covered by the second base 610. Since the second centrifugal fan blade 620 is not covered by the second base 610, the centrifugal fan for convection 600 may at least exhaust toward a first direction D1 toward the centrifugal fan for exhaust 500, and a second direction D2 toward the second through hole 132. In addition, the centrifugal fan for convection 600 can further exhaust toward other internal directions of the shell 100, such as a third direction D3, a fourth direction D4, and a fifth direction D5 illustrated in FIG. 3B.

In this embodiment, the second heat-dissipation module 400 has a second heat-absorption end 410 and a second heat-dissipation end 420, and the second heat-absorption end 410 of the second heat-dissipation module 400 thermally contacts with the second heat-generation device 12 and the first heat-generation device 11 at the same time.

In addition, the second heat-dissipation end 420 of the second heat-dissipation module 400 is located between the third gas outlet 614 and the second through hole 132. In other words, the second heat-dissipation end 420 is located on a flowing path of the gas flowing toward the second direction D2 and generated by the centrifugal fan for convection 600. When the centrifugal fan for convection 600 operates, the gas flow out of the shell 100 may directly flow into the centrifugal fan for convection 600 through the third through hole 122 of the bottom plate 120. The centrifugal fan for convection 600 discharges the gas flow toward all directions in the shell 100, such as the first direction D1, the second direction D2, the third direction D3, the fourth direction D4, and the fifth direction D5 illustrated in FIG. 3B.

The gas flow flowing toward the first direction D1 flows through the heat-generation module 13 and performs heat exchange with the heat-generation module 13, so as to remove the heat energy generated by the heat-generation module 13. The gas after the heat exchange with the heat-generation module 13 flows into the centrifugal fan for exhaust 500 through the first gas inlet 515, and is discharged to the outside of the shell 100 through the operation of the centrifugal fan for exhaust 500.

The gas flow flowing toward the second direction D2 performs the heat exchange with the second heat-dissipation end 420 through the second heat-dissipation end 420, and then is discharged to the outside of the shell 100 through the second through hole 132.

In addition, the gas flow flowing toward the third direction D3, the fourth direction D4, and the fifth direction D5 performs the heat exchange with other heat-generation units through other heat-generation units in the shell 100. The gas flow after the heat exchange with other heat-generation units flows into the centrifugal fan for exhaust 500 through the first gas inlet 515, and is discharged to the outside of the shell 100 through the operation of the centrifugal fan for exhaust 500.

It should be noted that, the mobile computing apparatus 10 of this embodiment has a second heat-dissipation module 400, while such feature is not intended to limit the present invention. For example, in another embodiment of the present invention, the mobile computing apparatus 10 may not have a second heat-dissipation module 400, the second heat-generation device 12 and the heat-generation module 13 may perform the heat exchange through the forced convection generated by the centrifugal fan for convection 600 in the shell 100, and the gas flow after absorbing the heat energy is discharged to the outside of the shell 100 through the centrifugal fan for exhaust 500.

Moreover, in order to enable a part of the gas flow generated by the centrifugal fan for convection 600 to smoothly flow toward the centrifugal fan for exhaust 500 along the first direction D1, in this embodiment, a plurality of guide plates 700 extending from the centrifugal fan for exhaust 500 toward the centrifugal fan for convection 600 is configured between the centrifugal fan for exhaust 500 and the centrifugal fan for convection 600. In this embodiment, the guide plates 700 are configured in the mobile computing apparatus 10, and stands on the bottom plate 120. Since the gas discharged by the centrifugal fan for convection 600 first blows through the heat-generation module 13 after the guidance of the guide plates 700, and then flows toward the centrifugal fan for exhaust 500, the guide plates 700 of this embodiment can further strengthen the heat-dissipation effect on the heat-generation module 13 in addition to the advantage of enabling the gas discharged by the centrifugal fan for convection 600 to more smoothly flow toward the centrifugal fan for exhaust 500.

Figure 1A:
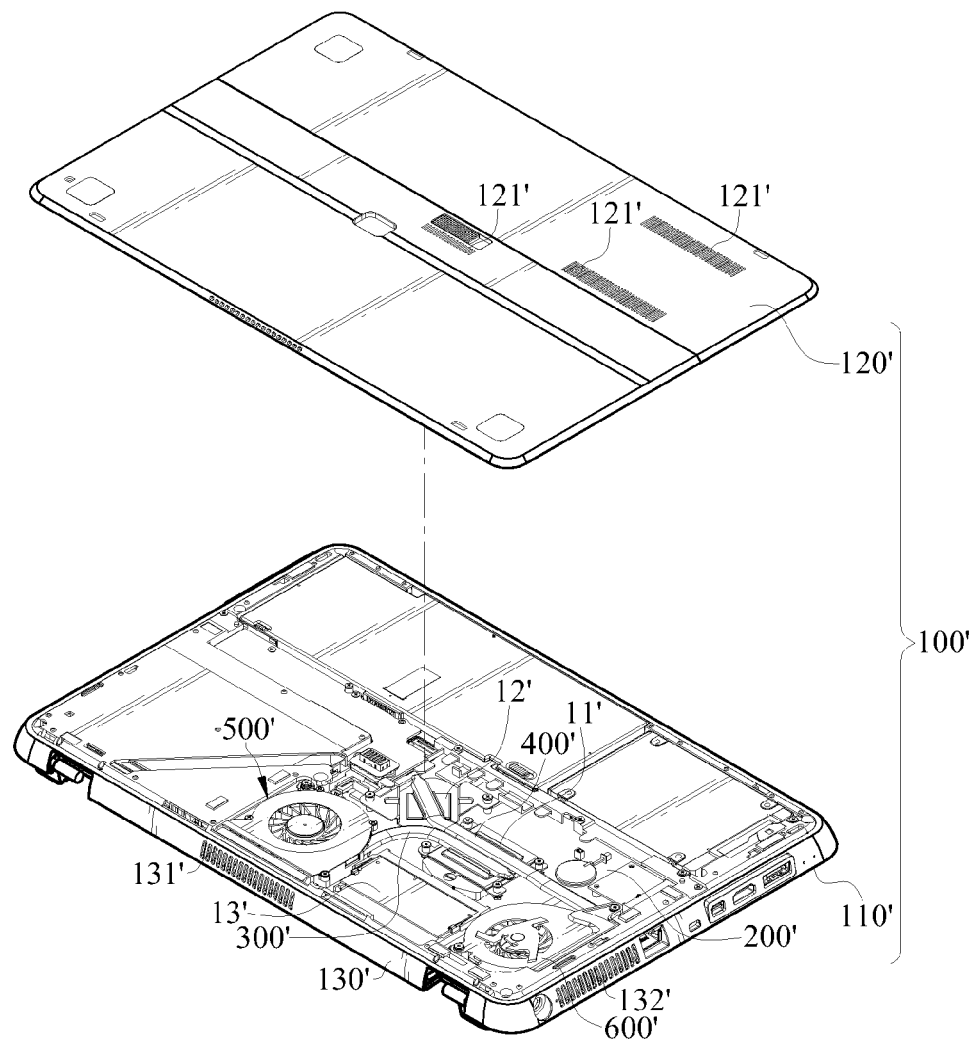
FIG. 1A is a schematic structural view of a conventional mobile computing apparatus.
Figure 1B:
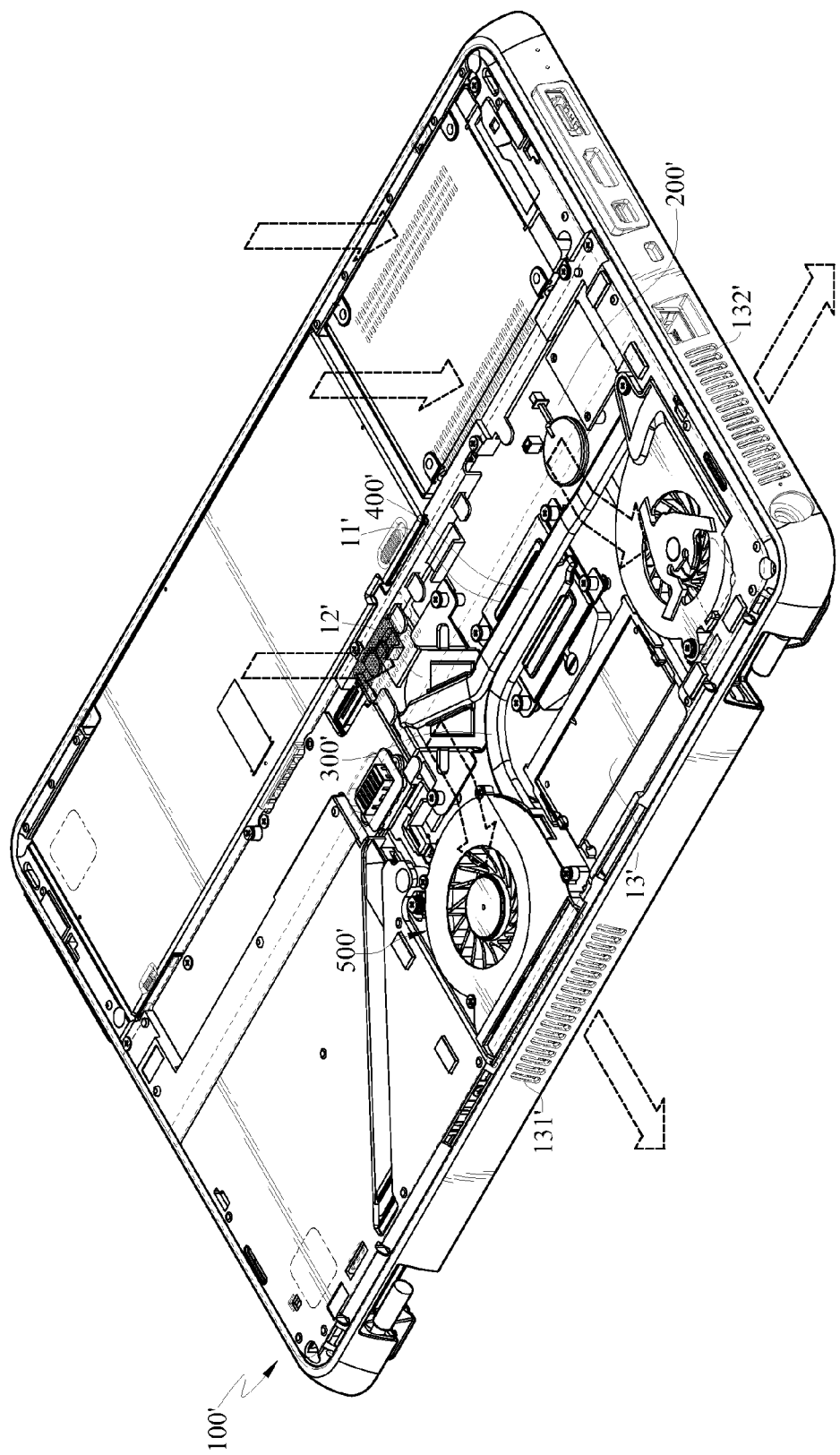
FIG. 1B is a structural perspective view of the conventional mobile computing apparatus.

| | FIG. 1A Conventional mobile computing apparatus | FIG. 3A Mobile computing apparatus in this embodiment |
| --- | --- | --- |
| First heat-generation device 11 (CPU) | 47.0° C. | 46.6° C. |
| Heat-generation module 13 (DDR) | 45.9° C. | 39.7° C. |
| Second through hole 132 | 39.8° C. | 29.2° C. |
| First through hole 131 | 37.9° C. | 36.9° C. |
| Surface of the heat-generation module 13 (DDR) | 38.1° C. | 33.5° C. |

It should be noted that, the above table shows comparison data of a temperature test between the conventional mobile computing apparatus and the mobile computing apparatus in this embodiment provided by the inventor. It can be known from the above table that, the temperature of the heat-generation module 13 of the mobile computing apparatus 10 in this embodiment is dramatically reduced by 6.2° C. in comparison with the conventional mobile computing apparatus. The temperature of the gas flow discharged from the third gas outlet 614 to the second through hole 132 is also reduced from 39.8° C. to 29.2° C. It can be known that, compared with the conventional mobile computing apparatus, the mobile computing apparatus 10 in this embodiment has lower temperature of the entire system. In other words, the mobile computing apparatus 10 in this embodiment has a better heat-dissipation effect.

According to the mobile computing apparatus of the foregoing embodiment, the centrifugal fan for convection exhausts toward the inside of the shell, so that the heat convection is generated in the mobile computing apparatus due to gas flow circulation. The heat energy generated by all the heat-generation components in the mobile computing apparatus can be discharged to the outside of the shell through the heat convection in the mobile computing apparatus. Such mobile computing apparatus has the better heat-dissipation effect than the conventional mobile computing apparatus, so that the stability of the entire system of the mobile computing apparatus further rises.

In addition, the centrifugal fan for convection may be a centrifugal fan without cover, so during the operation process of the fan blade of the centrifugal fan for convection, the cover is prevented from generating turbulent flow on the gas flow generated by the fan blade, and therefore the noise generated due to the operation of the fan blade is relatively reduced. In this way, under a certain noise standard, compared with the centrifugal fan with cover, the centrifugal fan without cover has a faster operation speed, so as to provide a better heat-dissipation effect.

What is claimed is:

1. A mobile computing apparatus, comprising:
    a shell, comprising a top plate and a bottom plate being opposite to each other, and a side plate connecting the bottom plate and the top plate, wherein the side plate has a first through hole;
    a circuit board, located among the top plate, the bottom plate and the side plate, and having a first heat-generation device;
    a first heat-dissipation module, having a first heat-absorption end and a first heat-dissipation end, wherein the first heat-absorption end thermally contacts with the first heat-generation device;
    a centrifugal fan for exhaust, having a first gas outlet, wherein the first heat-dissipation end is located between the first gas outlet and the first through hole, so that the centrifugal fan for exhaust exhausts to the outside of the shell; and a centrifugal fan for convection, configured in the shell, and exhausting toward a first direction, so that the centrifugal fan for convection exhausts to the inside of the shell.

2. The mobile computing apparatus according to claim 1, wherein the centrifugal fan for convection comprises:
a second base, having a second surface and a second cover standing on the second surface, wherein the second cover has a second gas outlet, and the second gas outlet faces toward the centrifugal fan for exhaust, so that the centrifugal fan for convection exhausts toward the first direction;
a second centrifugal fan blade, located on the second surface; and
a second motor, connected to the second centrifugal fan blade and located between the second centrifugal fan blade and the second surface.

3. The mobile computing apparatus according to claim 1, further comprising a second heat-dissipation module, having a second heat-absorption end and a second heat-dissipation end, wherein the circuit board has a second heat-generation device thermally contacting with the second heat-absorption end, the side plate has a second through hole, the centrifugal fan for convection exhausts toward a second direction, and the second direction faces toward the second through hole, so that the centrifugal fan for convection exhausts to the outside of the shell, and the second heat-dissipation end is located on a flowing path of a gas flowing toward the second direction and generated by the centrifugal fan for convection, and the first direction faces toward the centrifugal fan for exhaust, so that the gas flowing toward the first direction and generated by the centrifugal fan for convection flows toward the centrifugal fan for exhaust.

4. The mobile computing apparatus according to claim 3, wherein the centrifugal fan for convection comprises:
a second base, having a second surface and a second cover standing on the second surface, wherein the second cover has a second gas outlet and a third gas outlet, the second gas outlet faces toward the centrifugal fan for exhaust, so that the centrifugal fan for convection exhausts toward the centrifugal fan for exhaust, and the third gas outlet faces toward the second through hole, so that the centrifugal fan for convection exhausts toward the second direction;
a second centrifugal fan blade, located on the second surface; and
a second motor, connected to the second centrifugal fan blade and located between the second centrifugal fan blade and the second surface.

5. The mobile computing apparatus according to claim 3, wherein the circuit board further comprises a heat-generation module, located between the centrifugal fan for exhaust and the centrifugal fan for convection, and located on the flowing path of the gas flowing toward the first direction and generated by the centrifugal fan for convection.

6. The mobile computing apparatus according to claim 5, wherein the bottom plate has a third through hole, and the centrifugal fan for convection comprises:
a second base;
a second centrifugal fan blade, located on the second base, wherein the third through hole exposes a part of the second centrifugal fan blade; and
a second motor, connected to the second centrifugal fan blade and located between the second centrifugal fan blade and the second base.

7. The mobile computing apparatus according to claim 1, wherein the circuit board further comprises a heat-generation module, located between the centrifugal fan for exhaust and the centrifugal fan for convection, and located on the flowing path of the gas flowing toward the first direction and generated by the centrifugal fan for convection.

8. The mobile computing apparatus according to claim 7, wherein the bottom plate has a third through hole, and the centrifugal fan for convection comprises:
a second base;
a second centrifugal fan blade, located on the second base, wherein the third through hole exposes a part of the second centrifugal fan blade; and
a second motor, connected to the second centrifugal fan blade and located between the second centrifugal fan blade and the second base.

9. The mobile computing apparatus according to claim 1, further comprising a plurality of guide plates, located between the centrifugal fan for exhaust and the centrifugal fan for convection, and extending from the centrifugal fan for convection toward the centrifugal fan for exhaust.

10. A mobile computing apparatus, comprising:
a shell, comprising a top plate and a bottom plate being opposite to each other, and a side plate connecting the bottom plate and the top plate, wherein the side plate has a first through hole;
a circuit board, located among the top plate, the bottom plate and the side plate, and having a first heat-generation device;
a first heat-dissipation module, having a first heat-absorption end and a first heat-dissipation end, wherein the first heat-absorption end thermally contacts with the first heat-generation device;
a centrifugal fan with cover, having a first gas outlet, wherein the first heat-dissipation end is located between the first gas outlet and the first through hole, so that the centrifugal fan with cover exhausts to the outside of the shell; and
a centrifugal fan without cover, configured in the shell, and comprising:
a second base;
a second centrifugal fan blade, located on the second base; and
a second motor, connected to the second centrifugal fan blade, and located between the second centrifugal fan blade and the second base, wherein a part of the gas flow generated by the second centrifugal fan blade flows toward a first direction, so that the centrifugal fan without cover exhausts to the inside of the shell.

11. The mobile computing apparatus according to claim 10, wherein the gas flow flowing toward the first direction and generated by the second centrifugal fan blade flows toward the centrifugal fan with cover.

12. The mobile computing apparatus according to claim 10, further comprising a second heat-dissipation module, having a second heat-absorption end and a second heat-dissipation end, wherein the circuit board has a second heat-generation device thermally contacting with the second heat-absorption end, the side plate has a second through hole, a part of the gas flow generated by the second centrifugal fan blade flows toward a second direction, and the second direction passes through the second heat-dissipation end and faces toward the second through hole, so that the centrifugal fan without cover exhausts to the outside of the shell.

13. The mobile computing apparatus according to claim 12, wherein the circuit board further comprises a heat-generation module, located between the centrifugal fan with cover and the centrifugal fan without cover, and located on the flowing path of the gas flowing toward the first direction and generated by the centrifugal fan without cover.

14. The mobile computing apparatus according to claim 13, wherein the bottom plate has a third through hole, and the third through hole exposes a part of the centrifugal fan blade.

15. The mobile computing apparatus according to claim 10, wherein the circuit board further comprises a heat-generation module, located between the centrifugal fan with cover and the centrifugal fan without cover, and located on the flowing path of the gas flowing toward the first direction and generated by the centrifugal fan without cover.

16. The mobile computing apparatus according to claim 15, wherein the bottom plate has a third through hole, and the third through hole exposes a part of the centrifugal fan blade.

17. The mobile computing apparatus according to claim 10, further comprising a plurality of guide plates, located between the centrifugal fan with cover and the centrifugal fan without cover, and extending from the centrifugal fan without cover toward the centrifugal fan with cover.

18. A mobile computing apparatus, comprising:
- a shell, comprising a top plate and a bottom plate being opposite to each other, and a side plate connecting the bottom plate and the top plate, wherein the side plate has a first through hole;
- a circuit board, located among the top plate, the bottom plate and the side plate, and has a first heat-generation device;
- a first heat-dissipation module, having a first heat-absorption end and a first heat-dissipation end, wherein the first heat-absorption end thermally contacts with the first heat-generation device;
- a centrifugal fan with cover, having a first gas outlet, wherein the first heat-dissipation end is located between the first gas outlet and the first through hole, so that the centrifugal fan with cover exhausts to the outside of the shell; and
- a centrifugal fan without cover, configured in the shell, and consisting essentially of:
  - a second base;
  - a second centrifugal fan blade, located on the second base; and
  - a second motor, connected to the second centrifugal fan blade, and located between the second centrifugal fan blade and the second base, wherein a part of the gas flow generated by the second centrifugal fan blade flows toward a first direction, so that the centrifugal fan without cover exhausts to the inside of the shell.

* * * * *